June 2, 1925. 1,540,410
H. E. MARTIN ET AL
MACHINE FOR SHAPING AND CUTTING TOFFEE, CANDY, OR LIKE SWEETMEAT
Filed Nov. 26, 1924   3 Sheets-Sheet 1

June 2, 1925.

H. E. MARTIN ET AL 1,540,410

MACHINE FOR SHAPING AND CUTTING TOFFEE, CANDY, OR LIKE SWEETMEAT

Filed Nov. 26, 1924

H. E. MARTIN ET AL

MACHINE FOR SHAPING AND CUTTING TOFFEE, CANDY, OR LIKE SWEETMEAT

Filed Nov. 26, 1924  3 Sheets-Sheet 3

1,540,410

Inventors
H.E.Martin
R.A.Harris
By Marks Clerk
Attys.

Patented June 2, 1925.

1,540,410

UNITED STATES PATENT OFFICE.

HORACE ELTON MARTIN AND RICHARD ANSON HARRIS, OF PETERBOROUGH, ENGLAND.

MACHINE FOR SHAPING AND CUTTING TOFFEE, CANDY, OR LIKE SWEETMEAT.

Application filed November 26, 1924. Serial No. 752,486.

*To all whom it may concern:*

Be it known that we, HORACE ELTON MARTIN, residing at Peterborough, in the county of Northants, England, and RICHARD ANSON HARRIS, residing at Peterborough, in the county of Northants, England, both British subjects, have invented certain new and useful Improvements in Machines for Shaping and Cutting Toffee, Candy, or like Sweetmeat, of which the following is a specification.

This invention relates to machines for shaping and cutting toffee, candy or like sweetmeat, and has or its object to expedite the said operations and the delivery of the individual pieces produced thereby.

According to our invention the toffee, candy or like sweetmeat, which is admitted to the machine in a rope or flexible rod form, is fed and shaped in turn between two pairs of rolls which are revolved intermittently, and after issuing from the second pair of rolls is cut off by a knife operating intermittently in the intervals when the rolls are stationary.

The peripheries of the rolls are shaped to form a pass between them corresponding with the shape or section to be given to the toffee. To give a true square or rectangular section to the toffee the rolls are shaped to provide a pass with slightly convex sides to impart a slight concavity to the toffee in its passage through the rolls. After such passage the said concavity disappears by the shrinkage of the toffee. On leaving the second pair of rolls the toffee is passed through a rectangular guide bush and is then cut off by a reciprocating knife.

The mechanism employed for driving the rolls is preferably of the Geneva stop type.

Referring to the accompanying sheet of explanatory drawings:—

The same reference letters in the two views indicate the same parts.

The two pairs of rolls $a$, $b$, and $c$, $d$, are disposed in tandem and with the passes between the respective pairs in alignment. The rolls, in the example illustrated, are driven from the main shaft or spindle $e$ of the machine through bevel gears, $f$, $g$, and $h$, $i$, and spur wheels $j$, $k$, $m$, $n$, $o$, the wheel $o$ being affixed to the spindle $p$ which carries the pin wheel $q$ of the Geneva stop or like mechanism for converting the continuous rotary motion of the said spindle $p$ into the required intermittent angular or partial rotary movement of the rolls. The pin wheel $q$ engages the gapped disc $r$ of the said Geneva stop or like mechanism, said disc being affixed to the spindle of roll $b$. Rolls $a$ and $b$ are geared together by spur wheels $s$ and $t$ and rolls $c$ and $d$ by spur wheels $u$ and $v$. The driving connection between the respective pairs of rolls is afforded by spur wheel $w$.

Figure 1:
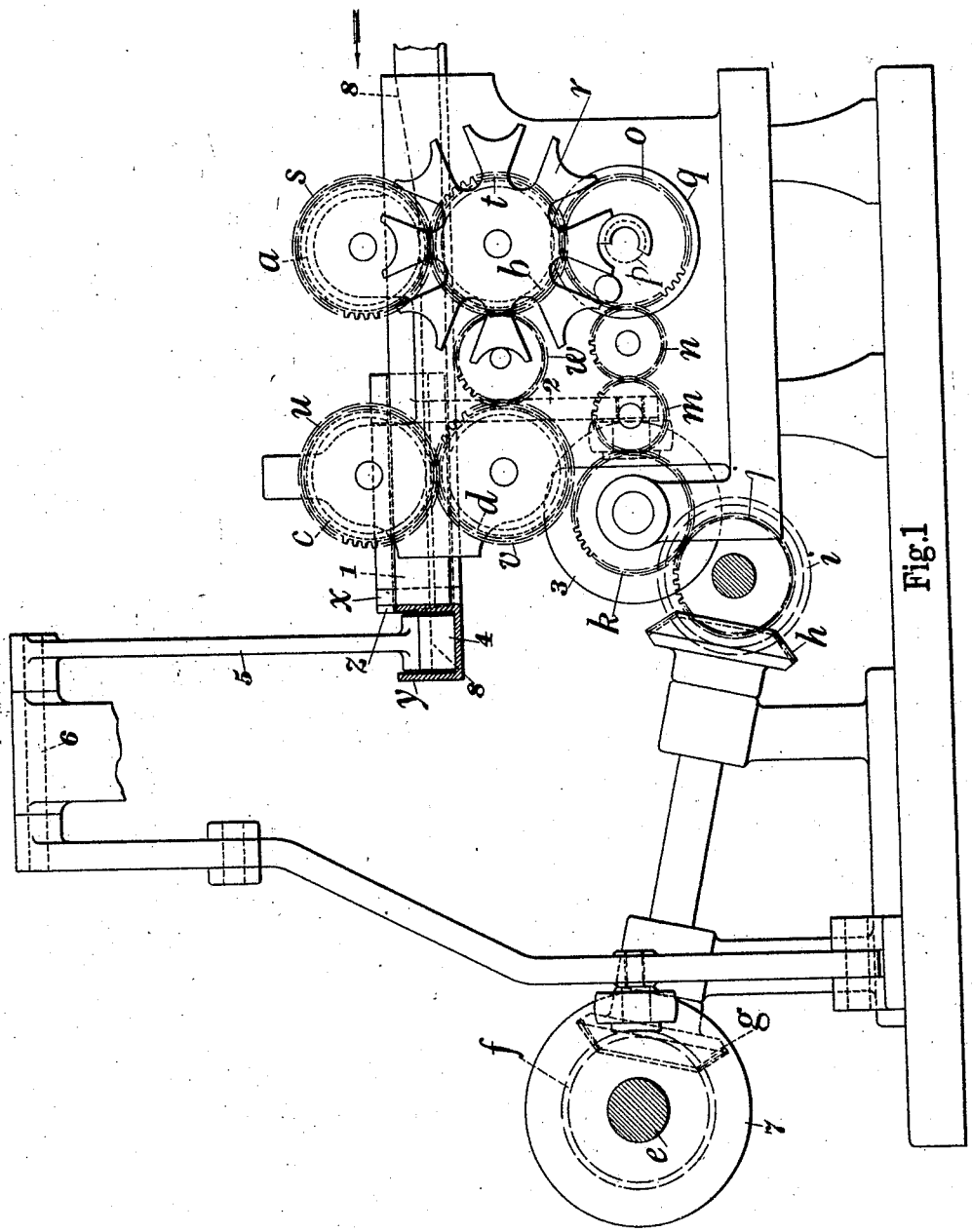
Figure 1 is a side elevation, and Figure 2 an end elevation illustrating, in diagrammatic form, a toffee shaping and cutting machine constructed in accordance with this invention.

The toffee in the rope like or continuous rod or bar form previously imparted to it, is advanced in the direction of the arrow at Figure 1, to the pass between the first pair of rolls, $a$, $b$, from whence it is delivered along a short straight trough or guide to the second pair of rolls, $c$, $d$. On leaving the latter rolls the toffee, which has now been rolled to the required section, passes through the bush or die $x$ and across the trough or channel $y$. When a piece of the desired length has been thus projected through the bush or die $x$ and across the trough $y$, said piece is cut or sheared by the action of the knife blade $z$ which is reciprocated across the outer face of said die. The knife blade is mounted on the pivot pin $l$. The same pin carries the lever 2 whereby the knife is operated from the cam 3 which engages the said lever. The said cam is suitably shaped and timed so that it will impart shearing movements to the knife in the intervals between the roll movements.

The pieces of toffee cut off as aforesaid, are conveyed along the trough or channel $y$ to the wrapping machine by the action of a plunger or push arm 4 which is reciprocated in any convenient manner, as for example by the lever 5 pivoted at 6 and actuated from a face cam 7 on the aforesaid shaft or spindle $e$.

Figure 2:
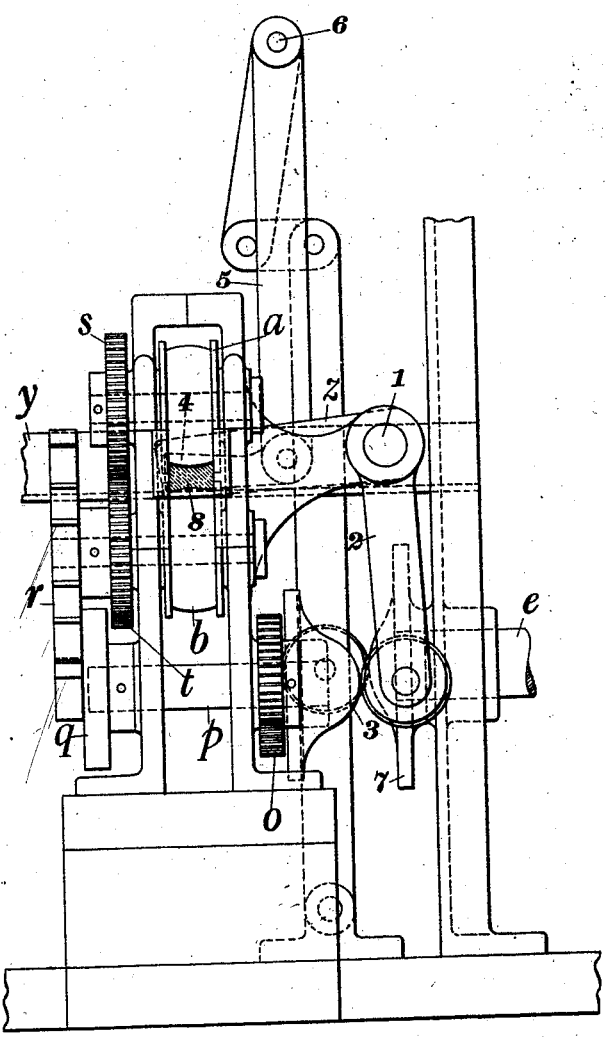
Figure 3:
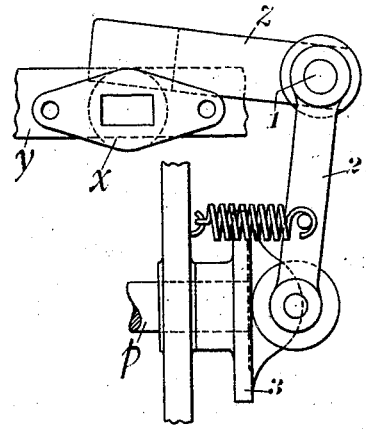
Fig. 3 is an end elevation, and Fig. 4 a side elevation showing in detail, the die, cutting knife and associated mechanism.
Figure 5:
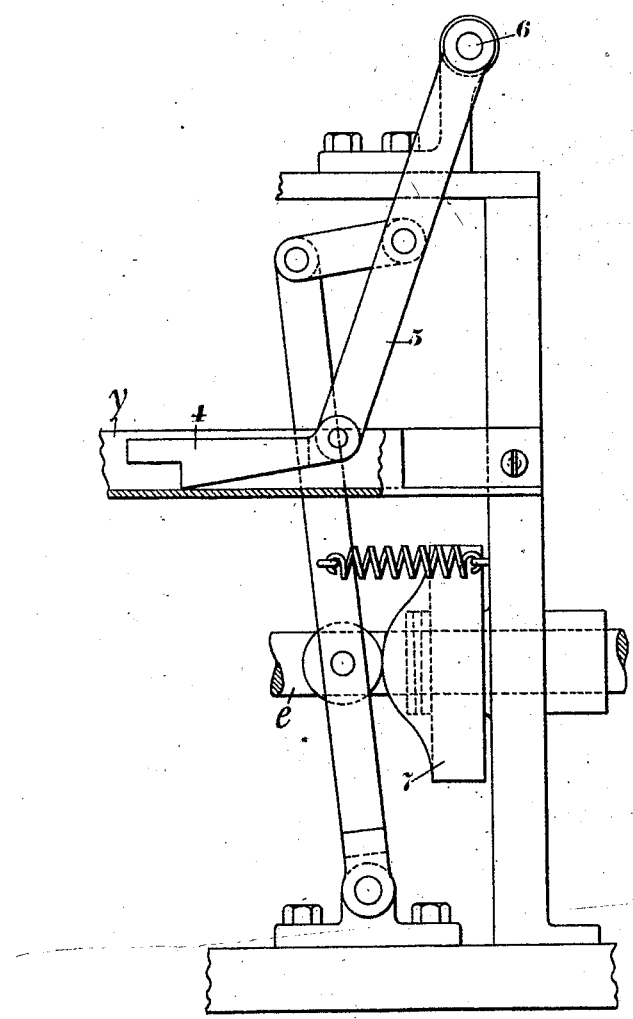
Fig. 5 is an end elevation showing in detail the push rod and its associated mechanism.
Figure 4:
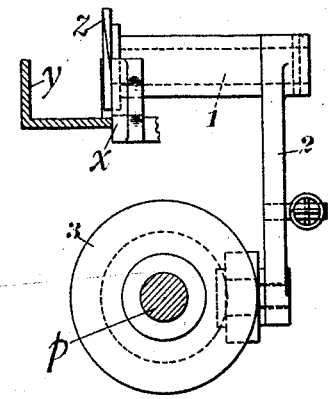

In Figure 2 the final shape assumed by the toffee in passing between the rolls is shown by the dotted section 8. The toffee is also represented by the dotted line 8 in Figure 1.

The whole of the mechanism aforesaid for shaping and cutting toffee may be arranged in association with the machine for wrapping the caramels or pieces formed by such cutting; or it may be mounted in a suitable framing or standards as an independent machine.

By the disposition of the two pairs of rolls in tandem and with the passes between the respective pairs in alignment, the toffee can be worked when in a cooler condition, without cracking, than is possible when it is required to traverse through an angular path.

Having thus described our invention what we claim as new and desire to secure by Letters Patent is:—

1. In toffee and like shaping and cutting machines, the combination comprising a plurality of pairs of toffee feeding rolls having their passes in alignment, means for imparting intermittent rotary movement to said rolls, a die coaxial with the said passes, a trough at right angles to the axis of the die, means whereby the forward portion of the toffee is severed after its projection by the rolls through said die and across said trough, and means for abutting against one end of said severed portion and pushing the same along the trough.

2. A toffee and like shaping and cutting machine as claimed in claim 1 in which the periphery of each roll is slightly convex transversely to impart a slight concavity to the toffee in its passage through the rolls, as and for the purpose described in the specification.

In testimony whereof we have signed our names to this specification.

HORACE ELTON MARTIN.
RICHARD ANSON HARRIS.